US006668545B2

(12) United States Patent
Brown

(10) Patent No.: US 6,668,545 B2
(45) Date of Patent: Dec. 30, 2003

(54) CATALYST WARM-UP ASSESSMENT METHOD FOR A MOTOR VEHICLE CATALYTIC CONVERTER

(75) Inventor: David Brian Brown, Brighton, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/820,597

(22) Filed: Mar. 30, 2001

(65) Prior Publication Data

US 2002/0139110 A1 Oct. 3, 2002

(51) Int. Cl.[7] ................................................ F01N 3/00
(52) U.S. Cl. ............................ 60/284; 60/274; 60/276; 60/277; 60/285
(58) Field of Search ........................ 60/274, 276, 277, 60/284, 285; 73/118.1, 23.31, 23.32; 123/691, 697

(56) References Cited

U.S. PATENT DOCUMENTS

| 5,335,538 A | * | 8/1994 | Blischke et al. ............ 73/118.1 |
| 5,419,122 A | * | 5/1995 | Tabe et al. .................... 60/277 |
| 5,509,267 A | * | 4/1996 | Theis ............................ 60/277 |
| 5,596,975 A | * | 1/1997 | Thomas et al. .............. 123/697 |
| 5,675,967 A | * | 10/1997 | Ries-Mueller ................ 60/284 |
| 5,727,383 A | * | 3/1998 | Yamashita et al. ............ 60/277 |
| 5,842,339 A | * | 12/1998 | Bush et al. .................... 60/274 |
| 5,847,271 A | * | 12/1998 | Poublon et al. ............... 60/277 |
| 6,050,128 A | * | 4/2000 | Hamburg et al. ............. 60/276 |
| 6,073,440 A | * | 6/2000 | Douta et al. .................. 60/284 |

FOREIGN PATENT DOCUMENTS

JP        2-136538        *    5/1990

* cited by examiner

Primary Examiner—Thomas Denion
Assistant Examiner—Tu M. Nguyen
(74) Attorney, Agent, or Firm—Christopher DeVries

(57) ABSTRACT

An improved method of assessing the catalyst warm-up rate of a motor vehicle catalytic converter is based on the response rates of fast warm-up exhaust gas sensors located in the exhaust gas upstream and downstream of the catalytic converter. The method essentially measures an oxygen storage characteristic of the catalyst that increases as the catalyst temperature rises to its ideal operating temperature. In one method, a ratio of switching frequency between the upstream and downstream exhaust gas sensors is periodically computed and compared to a threshold during catalyst warm-up. In another method, the response times of the exhaust gas sensors to a known air/fuel ratio transition are detected to form a measure of the oxygen storage characteristic that is compared to a threshold. In each method, the threshold varies as a function of cumulative airflow through the engine to compensate for different engine airflow levels.

7 Claims, 2 Drawing Sheets

US 6,668,545 B2

CATALYST WARM-UP ASSESSMENT METHOD FOR A MOTOR VEHICLE CATALYTIC CONVERTER

TECHNICAL FIELD

This invention relates to a diagnostic test method for a motor vehicle catalytic converter, and more particularly to a method for assessing the catalyst warm-up rate.

BACKGROUND OF THE INVENTION

Catalytic converters are commonly installed in the exhaust gas stream of motor vehicle engines to reduce tailpipe emissions. Once the temperature of the catalyst has risen to an ideal level (about 400–700° C.), the conversion efficiency is optimized by maintaining the engine air/fuel ratio in a specified range, typically with the aid of exhaust gas oxygen sensors located upstream and downstream of the converter. However, when the temperature of the catalyst is below the ideal level, the conversion efficiency is significantly degraded. Accordingly, a significant measure of the conversion efficiency is the rate at which the catalyst warms up following engine start-up, and it is therefore important to be able to assess the catalyst warm-up rate periodically during the life of the vehicle. Although this objective could be achieved with one or more temperature sensors placed in or near the converter, it is more desirable from a cost and reliability standpoint to use existing sensor information.

SUMMARY OF THE INVENTION

The present invention is directed to an improved method of assessing the catalyst warm-up rate of a motor vehicle catalytic converter based on the responses of fast warm-up exhaust gas sensors located in the exhaust gas upstream and downstream of the catalytic converter. The method essentially measures an oxygen storage characteristic of the catalyst that ideally increases as the catalyst temperature rises to its ideal operating temperature. According to a first embodiment of this invention, a ratio of switching frequency between the upstream and downstream exhaust gas sensors is periodically computed and compared to a threshold during catalyst warm-up. According to a second embodiment, the response times of the exhaust gas sensors to a known transition of the engine air/fuel ratio are detected to form a measure of the oxygen storage characteristic that is compared to a threshold. In each case, the threshold varies as a function of cumulative airflow through the engine to compensate for different engine airflow levels.

DESCRIPTION OF THE PREFERRED EMBODIMENT

Figure 1:
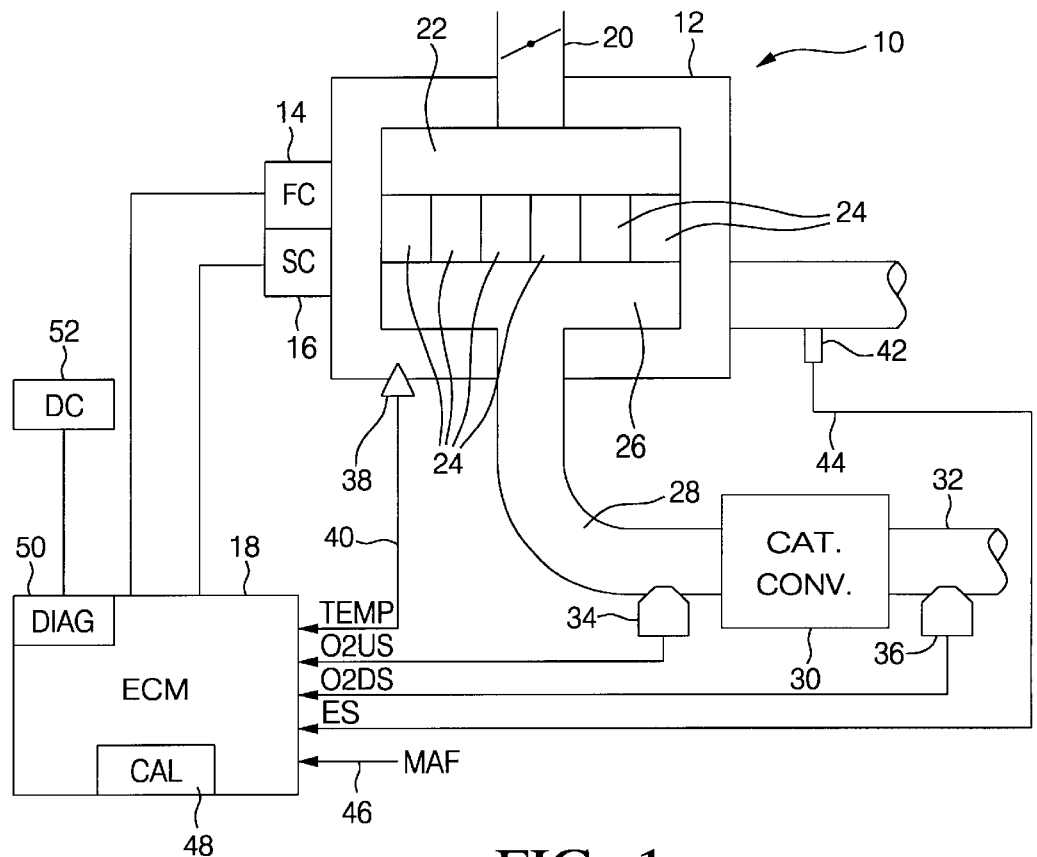
FIG. 1 is a schematic diagram of a vehicle powertrain, including an electronic control module programmed to carry out the method of this invention.

Referring to the drawings, and particularly to FIG. 1, the reference numeral 10 generally designates a portion of a vehicle drive train including a multi-cylinder internal combustion engine 12 having conventional fuel control (FC) and spark control (SC) mechanisms 14 and 16 operated under the control of a microprocessor-based electronic control module (ECM) 18. Air ingested through throttle 20 enters intake manifold 22 for distribution to the various engine cylinders 24 along with an appropriate quantity of fuel. After combustion of the air/fuel mixture, the combustion products (exhaust gases) pass through exhaust manifold 26, header pipe 28, catalytic converter 30, and tailpipe 32. Catalytic converter 30 is designed to reduce tailpipe emissions, and provides optimum performance when ECM 18 maintains the engine air/fuel ratio within a specified range. The ECM 18 performs the air/fuel ratio control based on a variety of input signals, including an upstream air/fuel ratio signal O2US produced by a first exhaust gas sensor 34 located upstream of catalytic converter 30 in header pipe 28 and a downstream air/fuel ratio signal O2DS produced by a second exhaust gas sensor 36 located downstream of catalytic converter 30 in tailpipe 32. In general, the upstream sensor 34 is used for fast feedback fuel control, while the downstream sensor 36 is used for slow feedback fuel control. Other pertinent inputs shown in FIG. 1 include a coolant temperature signal (TEMP) on line 40, an engine speed signal (ES) on line 44, and a mass air flow signal (MAF) on line 46. These signals are obtained with conventional sensors such as the temperature sensor 38 and the speed sensor 42, and are illustrative in nature.

In carrying out the fuel and other controls, ECM 18 relies on a number of calibration parameters, which are typically stored in a section of non-volatile memory (CAL), designated in FIG. 1 by the reference numeral 48. Finally, ECM 18 is also programmed to carry out a number of diagnostic routines for testing the operation of various powertrain components, and the results of such routines are typically stored in a section of non-volatile memory (DIAG) designated in FIG. 1 by the reference numeral 50 which is accessible to service instrumentation via diagnostic connector (DC) 52.

The method of this invention is principally directed to a diagnostic routine carried out by ECM 18 for assessing the warm-up rate of the catalyst material within catalytic converter 30 based on the air/fuel ratio signals O2US, O2DS obtained from upstream and downstream exhaust gas sensors 34, 36. To be effective for this purpose, the sensors 34, 36 must be designed for fast warm-up so that they are operational early in the warm-up period of the catalytic converter 30. For example, the oxygen sensors should have a warm-up time of approximately 10 seconds or less. The diagnostic routine essentially measures an oxygen storage characteristic of the catalyst that increases as the catalyst temperature rises to its ideal operating temperature of about 400–700° C.

It is assumed for purposes of this disclosure that the sensors 34 and 36 are switching oxygen sensors, meaning that the output signals O2US, O2DS toggle between high and low states in response to air/fuel ratios respectively above and below the stoichiometric ratio of 14.7:1. However, the method of this invention is also applicable to other types of exhaust gas sensors, including the so-called wide range or universal sensors that produce outputs that vary with the sensed air/fuel ratio in continuous or analog fashion.

According to a first embodiment of this invention, oxygen storage characteristic of the catalyst is measured based on the variation in a ratio of switching frequency between the upstream and downstream oxygen sensors during an initial period of closed-loop fuel control. Initially, the cold catalyst will exhibit a very low oxygen storage characteristic, and the upstream and downstream oxygen sensors 34, 36 will have a similar switching frequency in response to normally occurring excursions of the air/fuel ratio about stoichiometry. However, as the catalyst temperature increases, its oxygen storage characteristic also increases, and the switching frequency of the downstream oxygen sensor 36 will lag behind that of the upstream oxygen sensor 34. In the illustrated embodiment, the sensor switching frequencies are defined in terms of the number of output signal transitions occurring in a given time interval, and the oxygen storage characteristic is defined as the ratio of the upstream sensor transitions to the downstream sensor transitions. The number of transitions in a given interval is proportional to the switching frequency, so the calculated ratio will have an initial value of approximately one, and then increase as the catalyst temperature rises.

According to a second embodiment, oxygen storage characteristic of the catalyst is measured based on the variation in the response time of the upstream and downstream oxygen sensors to a known transition of the engine air/fuel ratio. In this case, the engine control module 18 periodically commands a known transition of the air/fuel ratio during the catalyst warm-up period, and the times required for the oxygen sensors 34, 36 to react to the transition is measured. Initially, the cold catalyst will exhibit a very low oxygen storage characteristic, and the upstream and downstream oxygen sensors 34, 36 will have exhibit similar response times to the air/fuel ratio transition. However, as the catalyst temperature increases during initial engine operation, its oxygen storage characteristic also increases, and the measured response time of the downstream oxygen sensor 36 will lag behind that of the upstream oxygen sensor.

Figure 3:
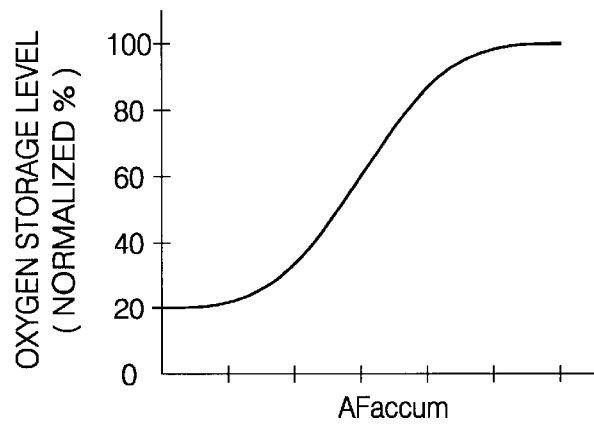
FIG. 3 is a graph depicting a minimum acceptable catalyst oxygen storage level as a function of cumulative engine air flow.

In each of the first and second embodiments, the measure of catalyst oxygen storage is compared to a threshold to determine if the catalyst warm-up rate is acceptable. In the preferred embodiment, the threshold is variable as a function of the cumulative engine air flow to compensate for different engine operating modes during the test interval. An example of the threshold is graphically depicted in FIG. 3 in terms of a normalized percentage of oxygen storage level as a function of the cumulative engine air flow AFaccum. Alternatively, the threshold could be made to vary as a function of time, so long as the engine air flow was maintained within a given range, such as normal idle air flow.

Figure 2:
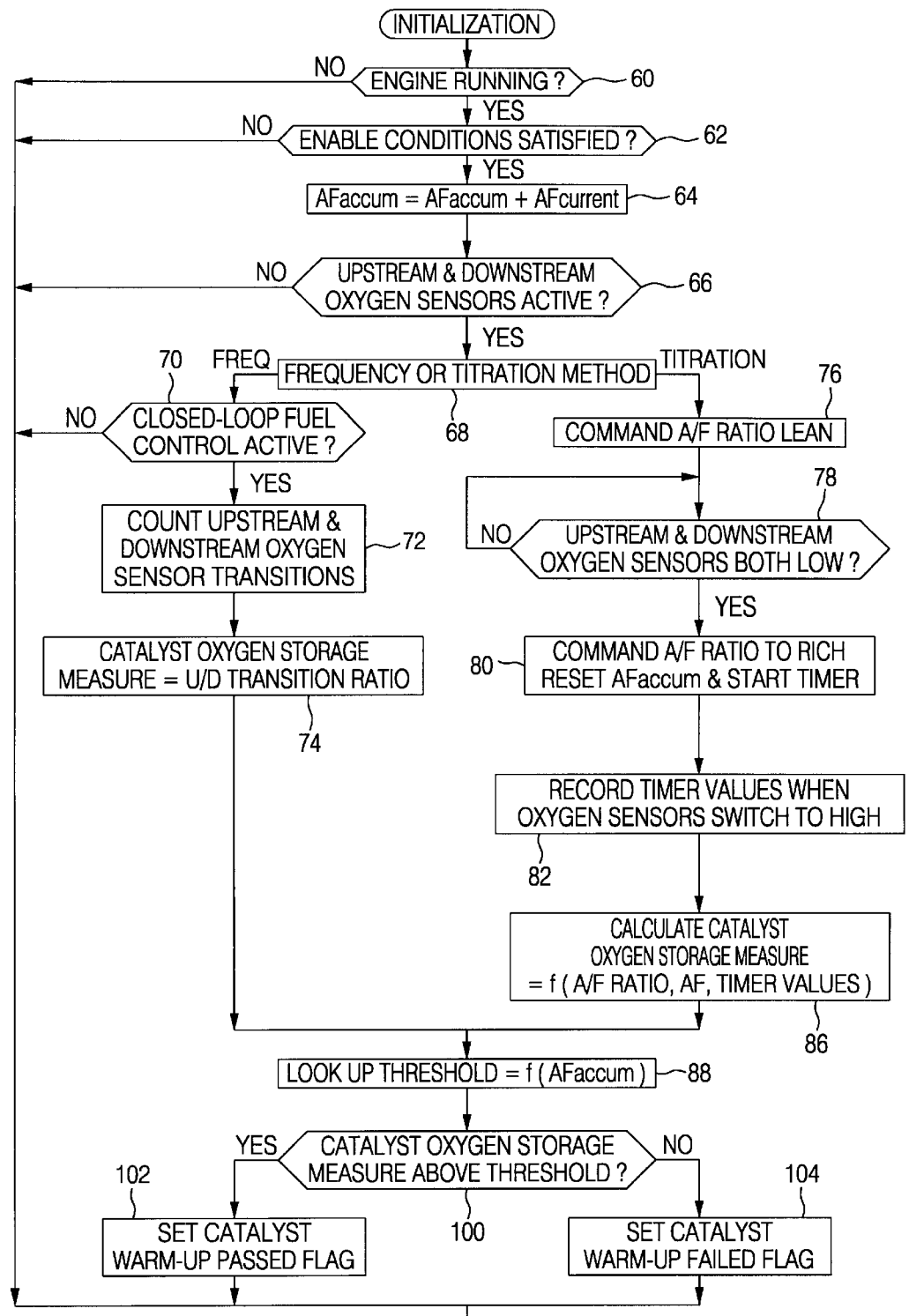
FIG. 2 is a flow diagram representative of computer program instructions executed by the electronic control module of FIG. 1 in carrying out the method of this invention.

The flow diagram of FIG. 2 illustrates the diagnostic routine as a series of instructions periodically executed by ECM 18 when power is applied to ECM 18 during an engine test sequence. Once blocks 60 and 62 determine that engine 12 has been started and that various enable conditions have been met, the block 64 is executed to update the cumulative air flow term AFaccum as the sum of the previous value of AFaccum and the current air flow value AFcurrent. The current air flow value AFcurrent may be determined based on the input signal MAF, for example. The enable conditions determined at block 62 may include, for example, engine speed ES within a specified range, coolant temperature TEMP within a specified range, and so on. Also, related diagnostic indications are checked; for example, if one of the oxygen sensors 34, 36 is believed to be faulty, the diagnostic routine of this invention is skipped. The block 66 then determines if the oxygen sensor signals O2US, O2DS are active; that is, if the sensors 34, 36 are operational. If not, the remainder of the routine is skipped, as indicated. However, once block 66 is answered in the affirmative, the block 68 is executed to determine if the catalyst oxygen storage characteristic is to be determined using the frequency method or the time response (titration) method. In certain applications, the routine may be set up to use one of the methods exclusively, while in other applications, a preferred method is selected based on engine operating conditions, for example.

The frequency method of determining the catalyst oxygen storage characteristic is defined by the blocks 70–74. First, the block 70 determines if ECM 18 has begun closed-loop air/fuel ratio control. If so, the air/fuel ratio will be dithering about the stoichiometric ratio, and the block 72 is executed to count the rich-to-lean and lean-to-rich transitions of the oxygen sensor signals O2US, O2DS over a predefined interval (such as five seconds) as a measure of the respective switching frequencies. The block 74 then computes a switching frequency ratio according to the quotient U/D, where U is the signal transition count of upstream sensor 34 and D is the signal transition count of downstream sensor 36. As mentioned above, the ratio U/D will have an initial value of approximately one, and then increase as the catalyst oxygen storage characteristic increases.

The time response (titration) method of determining the catalyst oxygen storage characteristic is defined by the blocks 76–86. First, the blocks 76 and 78 are executed to command the air/fuel ratio to the lean side of stoichiometry (such as 15.5:1), and to wait until both sensors 34, 36 produce a low state, which is indicative of a lean air/fuel ratio. When block 78 is answered in the affirmative, the block 80 is executed to command the air/fuel ratio to the rich side of stoichiometry (such as 13.5:1), and to start a timer. Then block 82 records the timer values when the upstream and downstream oxygen sensor output signals O2US, O2DS switch to a high state (indicative of a rich air/fuel ratio). Finally, block 86 calculates a measure of the catalyst oxygen storage characteristic as a function of the change in air/fuel ratio, the average engine air flow rate AF, and the timer value. Specifically, the catalyst oxygen storage is computed according to the product of the excess fuel rate during the timed interval, the duration of the interval, and the oxygen/fuel ratio for stoichiometry. The excess fuel rate is computed based on product of the average engine air flow AF during the interval and the difference in the fuel/air ratio over the test interval. The duration of the interval is given by the timer value, and the oxygen/fuel ratio for stoichiometry is a known quantity. Obviously, the catalyst oxygen storage characteristic may be determined in response to a rich-to-lean air/fuel ratio transition instead of the illustrated lean-to-rich air/fuel ratio transition.

Once the catalyst oxygen storage characteristic has been measured, by either method, the block 88 is executed to determine a corresponding oxygen storage threshold as a function of AFaccum, as mentioned above in respect to FIG. 3. The threshold is defined in terms of transition ratios corresponding to the normalized oxygen storage level if the frequency method is used, and in terms of oxygen storage mass if the time response (titration) method is used. Block 100 determines if the catalyst oxygen storage measure is above the respective threshold. If so, the block 102 sets a catalyst warm-up passed flag in the diagnostic memory of ECM 18; if not, the block 104 sets a catalyst warm-up failed flag in the diagnostic memory of ECM 18, completing the routine.

In summary, the testing method of this invention provides an effective and inexpensive technique for assessing if an in-vehicle catalytic converter exhibits a sufficiently fast warm-up rate to enable acceptable reduction of tailpipe emissions. While the present invention has been described in reference to the illustrated embodiments, it is expected that various modifications in addition to those mentioned above will occur to those skilled in the art. Accordingly, it will be understood that methods incorporating these and other modifications may fall within the scope of this invention, which is defined by the appended claims.

What is claimed is:

1. A method of assessing a catalyst warm up rate of a catalytic converter connected in an exhaust system of a motor vehicle internal combustion engine downstream of a first exhaust gas sensor and upstream of a second exhaust gas sensor, the method comprising the steps of:

specifying a warm-up rate of said first and second exhaust gas sensors that is faster than a nominal warm-up rate of said catalytic converter;

periodically measuring a first response rate of said first exhaust gas sensor and a second response rate of said second exhaust gas sensor during a warm-up period of said catalytic converter, and computing an oxygen storage characteristic of said catalytic converter based on a ratio of switching frequencies between said first and second exhaust gas sensors;

determining an oxygen storage threshold corresponding to a minimum desired catalyst warm-up rate; and indicating that the catalyst warm-up rate is good if the computed oxygen storage characteristics is greater than the oxygen storage threshold, and that the catalyst warm-up rate is bad if the computed oxygen storage characteristic is less than the oxygen storage threshold.

2. A method of assessing a catalyst warm up rate of a catalytic converter connected in an exhaust system of a motor vehicle internal combustion engine downstream of a first exhaust gas sensor and upstream of a second exhaust gas sensor, the method comprising the steps of:

specifying a warm-up rate of said first and second exhaust gas sensors that is faster than a nominal warm-up rate of said catalytic converter;

periodically measuring a first response rate of said first exhaust gas sensor and a second response raw of said second exhaust gas sensor during a warm-up period of said catalytic converter, and computing an oxygen storage characteristic of said catalytic converter based on a ratio of switching frequencies between said first and second exhaust gas sensors calculated over a predefined interval;

determining an oxygen storage threshold corresponding to a minimum desired catalyst warm-up rate; and indicating that the catalyst warm-up rate is good if the computed oxygen storage characteristics is greater than the oxygen storage threshold, and that the catalyst warm-up rate is bad if the computed oxygen storage characteristic is less than the oxygen storage threshold.

3. A method of assessing a catalyst warm-up rate of a catalytic converter connected in an exhaust system of a motor vehicle internal combustion engine downstream of a first exhaust gas sensor and upstream of a second exhaust gas sensor, the method comprising the steps of:

specifying a warm-up rate of said first and second exhaust gas sensors that is faster than a nominal warm-up rate of said catalytic converter;

periodically measuring a first response rate of said first exhaust gas sensor and a second response rate of said second exhaust gas sensor during a warm-up period of said catalytic converter, and computing an oxygen storage characteristic of said catalytic converter based on said first and second response rates;

determining an oxygen storage threshold corresponding to a minimum desired catalyst warm-up rate;

indicating that the catalyst warm-up rate is good if the computed oxygen storage characteristic is greater than oxygen storage threshold, and that the catalyst warm-up rate is bad if the computed oxygen storage characteristic is less than the oxygen storage threshold;

wherein an air/fuel ratio of said engine is controlled by a closed-loop control, and said first and second response rates correspond to output signal frequencies of said first and second exhaust gas sensors, respectively; and wherein said first and second exhaust gas sensors have respective first and second output signals that switch between high and low states in response to air/fuel ratios upstream and downstream of said catalytic converter, and said first and second response rates are measured by counting switching transitions of said first and second output signals over a predefined time interval.

4. The method of claim 3, wherein the oxygen storage threshold is determined as a function of a cumulative air flow rate through said exhaust system during said warm-up period.

5. The method of claim 1, wherein the step of computing the oxygen storage characteristic of said catalytic converter includes the step of:

computing a ratio of said first and second response rates.

6. The method of claim 1, including the steps of:

commanding a transition of an air/fuel ratio of said engine from a first level to a second level;

measuring a first time for said first exhaust gas sensor to respond to the air/fuel ratio transition, and a second time for said second exhaust gas sensor to respond to the air/fuel ratio transition; and computing the oxygen storage characteristic of said catalytic converter based on a difference between said first and second times.

7. The method of claim 6, wherein the step of computing the oxygen storage characteristic comprises the steps of:

computing a fuel rate based on an air flow rate through said exhaust system and a difference between said first and second air/fuel ratio levels;

computing a quantity of fuel consumed in said catalytic converter based on said fuel rate and said difference between said first and second times; and computing the oxygen storage characteristic of said catalytic converter based on said quantity of fuel consumed and a ratio of oxygen to fuel for an air/fuel ratio between said first and second air/fuel ratio levels.

* * * * *